US009539461B2

(12) United States Patent
Ercanbrack

(10) Patent No.: US 9,539,461 B2
(45) Date of Patent: Jan. 10, 2017

(54) HOOK ASSEMBLIES FOR EXERCISE MACHINES, EXERCISE MACHINES INCLUDING SUCH HOOK ASSEMBLIES, AND RELATED METHODS

(71) Applicant: ICON Health & Fitness, Inc., Logan, UT (US)

(72) Inventor: Gaylen Ercanbrack, Logan, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 69 days.

(21) Appl. No.: 14/068,123

(22) Filed: Oct. 31, 2013

(65) Prior Publication Data

US 2014/0121072 A1 May 1, 2014

Related U.S. Application Data

(60) Provisional application No. 61/720,843, filed on Oct. 31, 2012.

(51) Int. Cl.
*A63B 21/062* (2006.01)
*F16B 45/02* (2006.01)
*F16B 21/07* (2006.01)
*F16B 45/04* (2006.01)
*A63B 71/00* (2006.01)
*F16B 2/10* (2006.01)

(52) U.S. Cl.
CPC ......... *A63B 21/062* (2013.01); *A63B 21/0628* (2015.10); *F16B 21/073* (2013.01); *F16B 45/02* (2013.01); *F16B 45/04* (2013.01); *A63B 21/4035* (2015.10); *A63B 21/4043* (2015.10); *A63B 71/0054* (2013.01); *F16B 2/10* (2013.01); *F16B 21/078* (2013.01)

(58) Field of Classification Search
CPC ....... A63B 21/00; A63B 21/06; A63B 21/062; F16B 21/073; F16B 45/04; F16B 45/02
USPC ................................ 482/97–99, 92–94, 102
See application file for complete search history.

(56) References Cited

U.S. PATENT DOCUMENTS

| | | | | |
|---|---|---|---|---|
| 4,725,057 A * | 2/1988 | Shifferaw | ............ | A63B 21/026 482/121 |
| 7,828,703 B1 * | 11/2010 | Boesch | .............. | A63B 21/0602 482/112 |
| 8,715,140 B1 * | 5/2014 | Gertz | ....................... | A63B 9/00 482/35 |
| 2001/0027151 A1 * | 10/2001 | Siaperas | ................ | A63B 21/04 482/142 |
| 2010/0285935 A1 * | 11/2010 | Barnett | ................ | A63B 21/154 482/99 |

* cited by examiner

*Primary Examiner* — Stephen Crow
*Assistant Examiner* — Garrett Atkinson
(74) *Attorney, Agent, or Firm* — Holland & Hart LLP

(57) ABSTRACT

A hook assembly may comprise a base portion and at least one hook. The base portion may be rotatably coupled to a weighted cable of an exercise machine. The at least one hook may be coupled to the base portion, and the at least one hook may be sized and configured for selective attachment to a handle. The base portion may be sized and configured to facilitate rotation of the at least one hook relative to a frame of an exercise machine when the weighted cable is extended. Additionally, the base portion may be sized and configured to prevent rotation of the at least one hook relative to the frame of the exercise machine when the weighted cable is fully retracted.

9 Claims, 5 Drawing Sheets

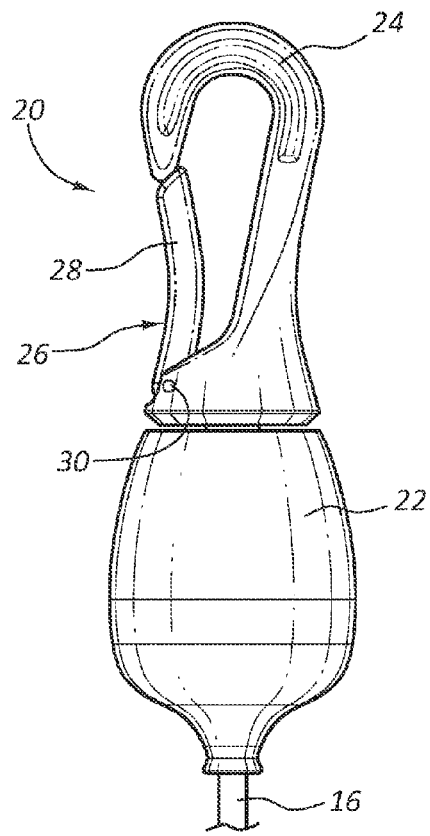 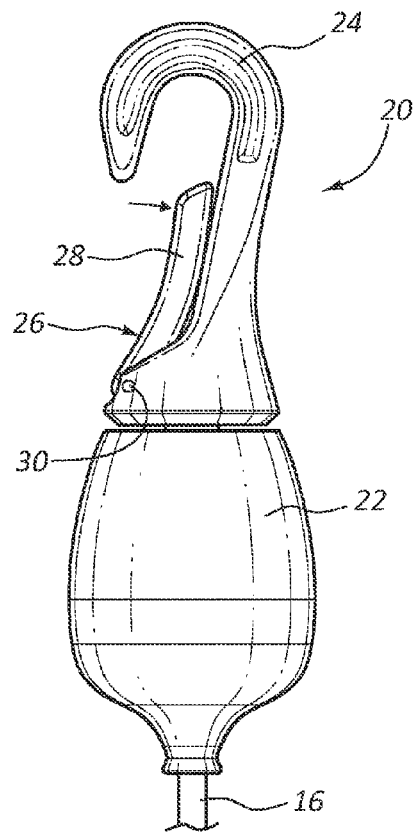
FIG. 2A  FIG. 2B
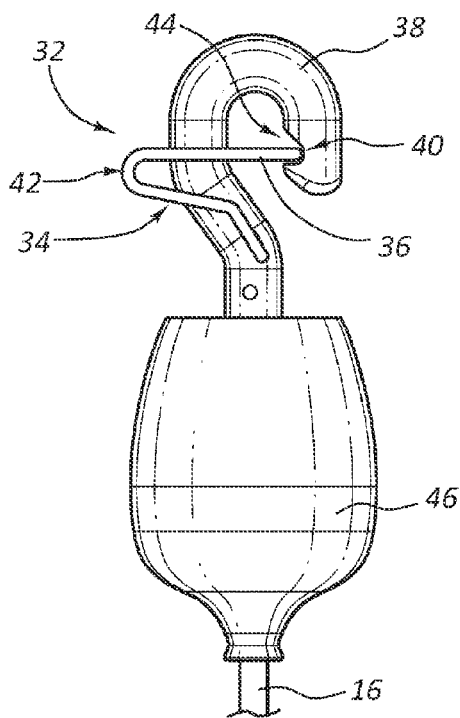 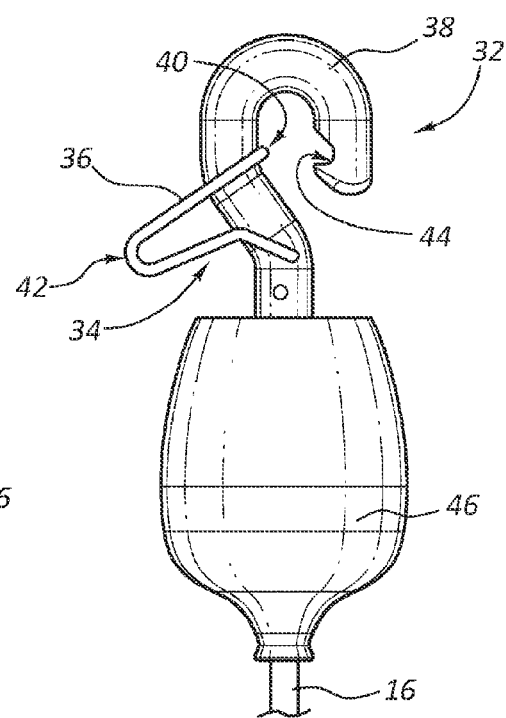
FIG. 3A  FIG. 3B

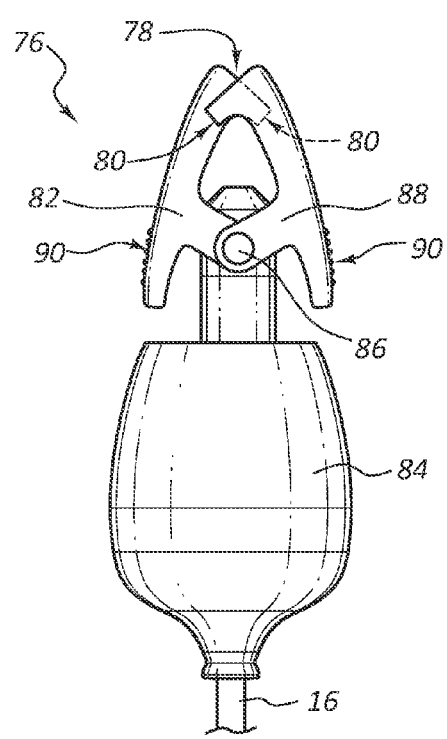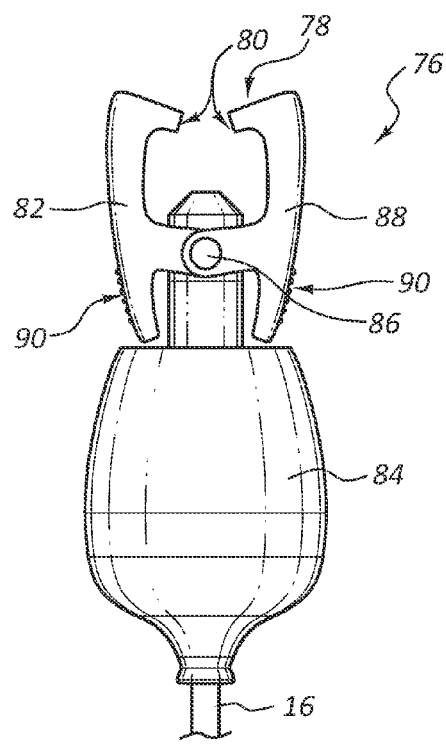
FIG. 6A    FIG. 6B
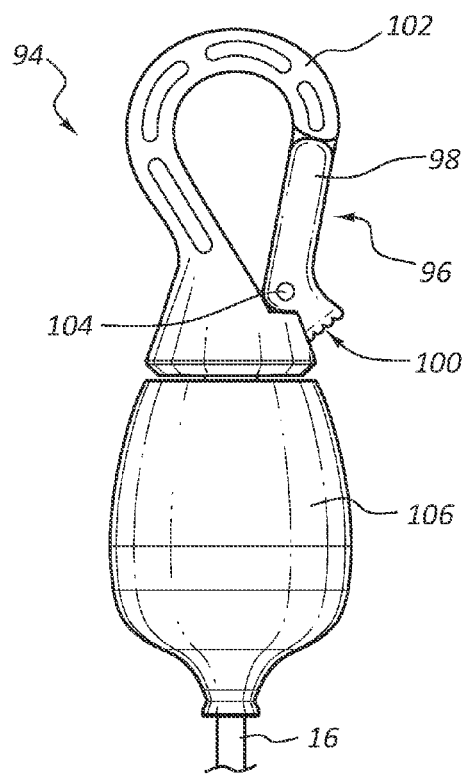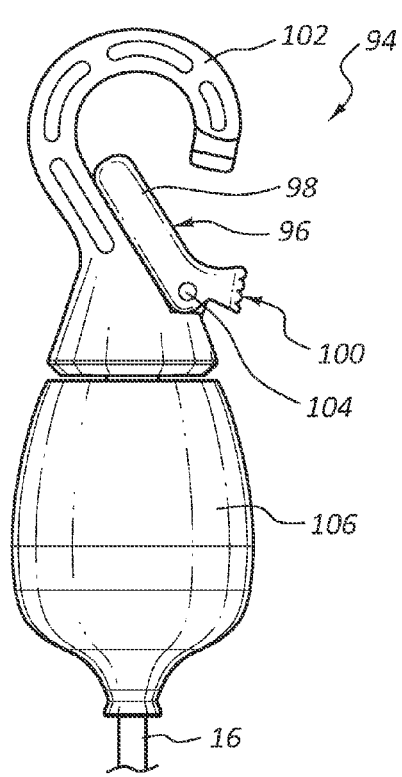
FIG. 7A    FIG. 7B

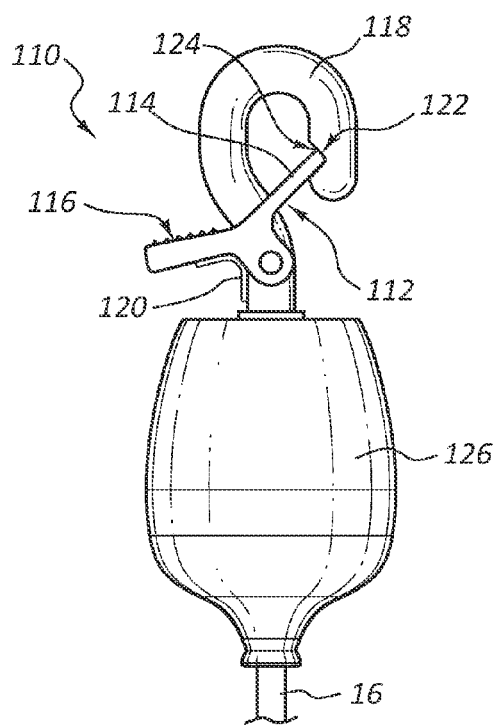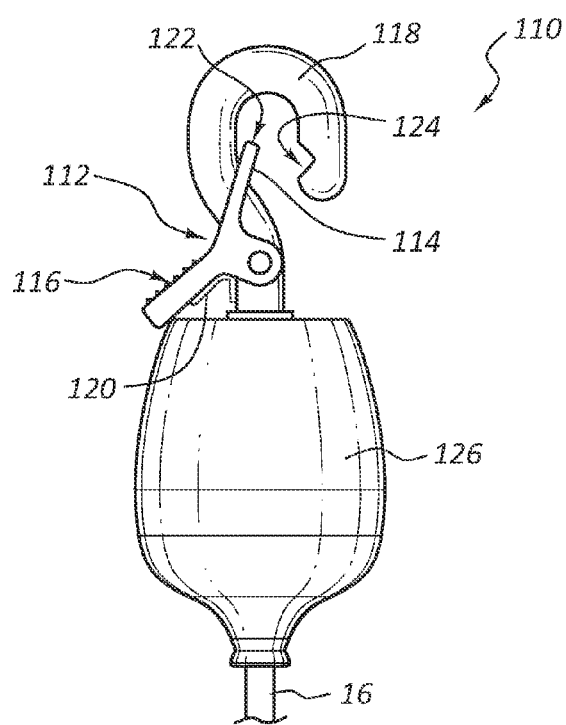
FIG. 8A    FIG. 8B
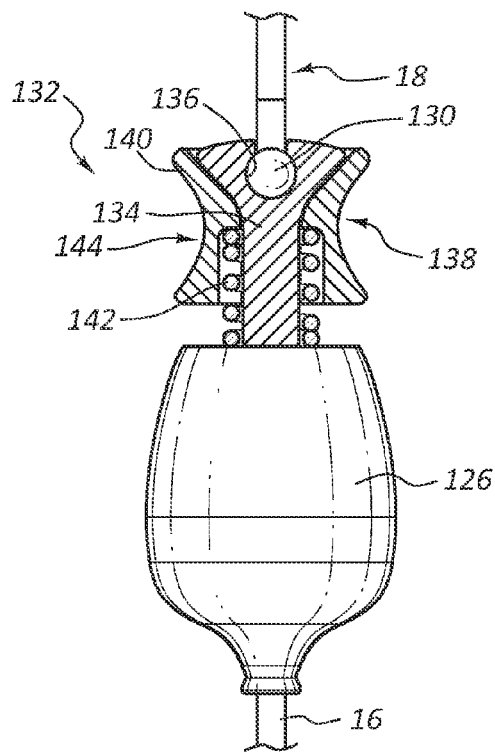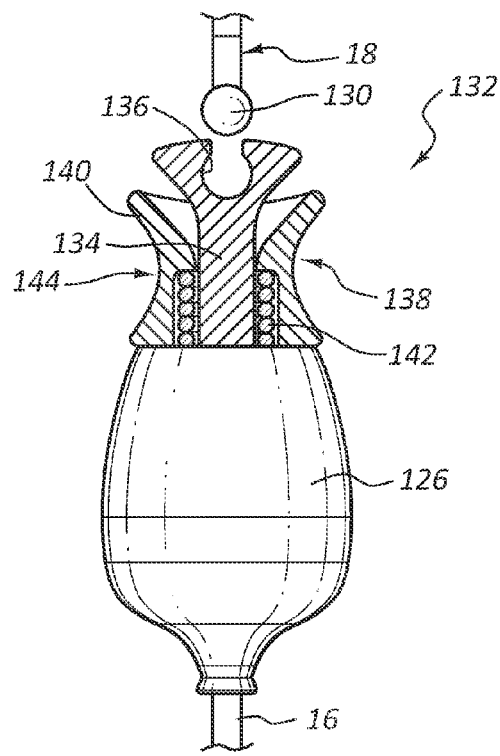
FIG. 9A    FIG. 9B

HOOK ASSEMBLIES FOR EXERCISE MACHINES, EXERCISE MACHINES INCLUDING SUCH HOOK ASSEMBLIES, AND RELATED METHODS

CROSS-REFERENCE TO RELATED APPLICATIONS

This application claims priority to U.S. Provisional Patent application 61/720,843 filed on Oct. 31, 2012.

TECHNICAL FIELD

The present disclosure relates to exercise machines that utilize weight bearing cables. More specifically, the present disclosure relates to hook assemblies for connecting attachments, such as handles, to the weighted cable.

BACKGROUND

Many exercise machines include one or more weighted cables that are coupled to an adjustable weight source, such as a stack of weights. Another end of the weighted cable may be coupled to a component with which a user engages with to exercise, such as a handle. Accordingly, the weighted cable may provide resistance force to a user during exercise by transferring force from the adjustable weight source.

Some exercise machines include a hook at an end of the weighted cable that allows a user to attach the end of the weighted cable to a handle. Typically, the weighted cable includes a loop or eyelet positioned at the end with an s-hook inserted therein. The s-hook facilitates the insertion and removal of the handle, but there are several shortcomings to this arrangement. The s-hook may dangle from the eyelet free to rotate and move about as a user is attempting to insert a handle. Accordingly, a user may have to hold the eyelet steady with one hand while inserting the handle with another hand. Additionally, the handle may unexpectedly be released from the s-hook as the handle moves and swings relative to the s-hook during use.

One type of handle connection system is disclosed in U.S. Pat. No. 4,725,057 issued to Tessema Shifferaw. In this patent, an exercise device is described including a number of handle attachments. As noted in this patent, the handle attachments are connected to the exercise device via a spring clip connected to the lower end of the actuating cable.

SUMMARY

One aspect of the present disclosure relates to a hook assembly comprising a base portion and at least one hook coupled to the base portion.

Another aspect of the disclosure may include any combination of the above-mentioned features and may further include the base portion rotatably coupled to a weighted cable of an exercise machine.

Another aspect of the disclosure may include any combination of the above-mentioned features and may further include at least one hook sized and configured for selective attachment to a handle.

Another aspect of the disclosure may include any combination of the above-mentioned features and may further include the base portion sized and configured to facilitate rotation of the at least one hook relative to a frame of an exercise machine when the weighted cable is extended and prevent rotation of the at least one hook relative to the frame of the exercise machine when the weighted cable is fully refracted.

Another aspect of the disclosure may include any combination of the above-mentioned features and may further include a retaining member configured to cooperate with the at least one hook to selectively prevent removal of the handle from the at least one hook.

Another aspect of the disclosure may include any combination of the above-mentioned features and may further include the retaining member biased to a locked position.

Another aspect of the disclosure may include any combination of the above-mentioned features and may further include the retaining member in the form of a shaped wire.

Another aspect of the disclosure may include any combination of the above-mentioned features and may further include a retaining member in the form of an annular sleeve.

Another aspect of the disclosure may include any combination of the above-mentioned features and may further include an extending lever configured to facilitate rotation of the retaining member relative to the at least one hook.

Another aspect of the disclosure may include any combination of the above-mentioned features and may further include at least one hook including a first hook hingably coupled to the base and a second hook hingably coupled to the base, the first hook and the second hook configured to interlock.

Another aspect of the disclosure may include any combination of the above-mentioned features and may further include a base portion having a shoulder configured to interface with a portion of the frame of the exercise machine when the weighted cable is fully retracted.

Another aspect of the disclosure may include any combination of the above-mentioned features and may further include an exercise machine comprising a frame, a weighted cable routed through the frame, and at least one hook assembly located on the weighted cable.

Another aspect of the disclosure may include any combination of the above-mentioned features and may further include at least one hook assembly having a base portion and at least one hook coupled to the base portion.

Another aspect of the disclosure may include any combination of the above-mentioned features and may further include a base portion rotatably coupled to the weighted cable.

Another aspect of the disclosure may include any combination of the above-mentioned features and may further include at least one hook sized and configured for selective attachment to a handle.

Another aspect of the disclosure may include any combination of the above-mentioned features and may further include a base portion sized and configured to facilitate rotation of the at least one hook relative to the frame when the weighted cable is extended and prevent rotation of the at least one hook relative to the frame when the weighted cable is fully refracted.

Another aspect of the disclosure may include any combination of the above-mentioned features and may further include a hook assembly including a retaining member configured to cooperate with the at least one hook to selectively prevent removal of the handle from the at least one hook.

Another aspect of the disclosure may include any combination of the above-mentioned features and may further include a retaining member biased to a locked position.

Another aspect of the disclosure may include any combination of the above-mentioned features and may further include a retaining member in the form of a shaped wire.

Another aspect of the disclosure may include any combination of the above-mentioned features and may further include a retaining member with an annular sleeve.

Another aspect of the disclosure may include any combination of the above-mentioned features and may further include a retaining member including an extending lever configured to facilitate rotation of the retaining member relative to the at least one hook.

Another aspect of the disclosure may include any combination of the above-mentioned features and may further include a first hook hingably coupled to the base and a second hook hingably coupled to the base, the first hook and the second hook configured to interlock.

Another aspect of the disclosure may include any combination of the above-mentioned features and may further include a base portion including a shoulder configured to interface with a portion of the frame when the weighted cable is fully retracted.

Another aspect of the disclosure may include any combination of the above-mentioned features and may further include a weighted cable having an enlarged end portion and wherein the at least one hook comprises a channel shaped to slidably receive the enlarged end portion and prevent longitudinal movement of the enlarged end portion relative to the hook when the enlarged end portion is positioned within the channel.

Another aspect of the disclosure may include any combination of the above-mentioned features and may further include a spring biased sleeve sized and configured to selectively lock the enlarged end within the channel of the hook.

Another aspect of the disclosure may include any combination of the above-mentioned features and may further include a handle to a weighted cable of an exercise machine.

Another aspect of the disclosure may include any combination of the above-mentioned features and may further include providing at least one hook assembly comprising a base portion rotatably coupled to the weighted cable, and at least one hook coupled to the base portion.

Another aspect of the disclosure may include any combination of the above-mentioned features and may further include preventing the hook from rotating utilizing the base portion when the weighted cable is fully retracted.

Another aspect of the disclosure may include any combination of the above-mentioned features and may further include attaching the handle to the at least one hook while the weighted cable is fully retracted.

Another aspect of the disclosure may include any combination of the above-mentioned features and may further include facilitating the rotation of the hook relative to the weighted cable utilizing the base portion when the weighted cable is extended.

Another aspect of the disclosure may include any combination of the above-mentioned features and may further include moving a retaining member from a first position to a second position to facilitate the attachment of the handle to the at least one hook.

Another aspect of the disclosure may include any combination of the above-mentioned features and may further include moving the retaining member from the second position to the first position after attachment of the handle to the at least one hook to prevent the removal of the handle from the at least one hook.

BRIEF DESCRIPTION OF THE DRAWINGS

The accompanying drawings illustrate various embodiments of the present methods and systems and are a part of the specification. The illustrated embodiments are merely examples of the present systems and methods and do not limit the scope thereof.

FIG. 2A is a side view of a hook assembly having a retaining member including a curved latch, according to an embodiment of the present disclosure, wherein the retaining member is located in a locked position.

FIG. 2B is a side view of the hook assembly of FIG. 2A, wherein the retaining member is located in an open position.

FIG. 3A is a side view of a hook assembly having a retaining member including a shaped wire, according to an embodiment of the present disclosure, wherein the retaining member is located in a locked position.

FIG. 3B is a side view of the hook assembly of FIG. 3A, wherein the retaining member is located in an open position.

FIG. 6A is a side view of a hook assembly having a retaining member including an interlocking hook, according to an embodiment of the present disclosure, wherein the retaining member is located in a locked position.

FIG. 6B is a side view of the hook assembly of FIG. 6A, wherein the retaining member is located in an open position.

FIG. 7A is a side view of a hook assembly having a retaining member including a thumb roll, according to an embodiment of the present disclosure, wherein the retaining member is located in a locked position.

FIG. 7B is a side view of the hook assembly of FIG. 7A, wherein the retaining member is located in an open position.

FIG. 8A is a side view of a hook assembly having a retaining member including an extending lever, according to an embodiment of the present disclosure, wherein the retaining member is located in a locked position.

FIG. 8B is a side view of the hook assembly of FIG. 8A, wherein the retaining member is located in an open position.

FIG. 9A is a side view of a hook assembly having a retaining member including an annular sleeve and a hook including a channel shaped to slidably receive an enlarged end portion of a weighted cable, according to an embodiment of the present disclosure, wherein the retaining member is located in a locked position.

FIG. 9B is a side view of the hook assembly of FIG. 9A, wherein the retaining member is located in an open position.

Throughout the drawings, identical reference numbers designate similar, but not necessarily identical, elements.

DETAILED DESCRIPTION

Figure 1:
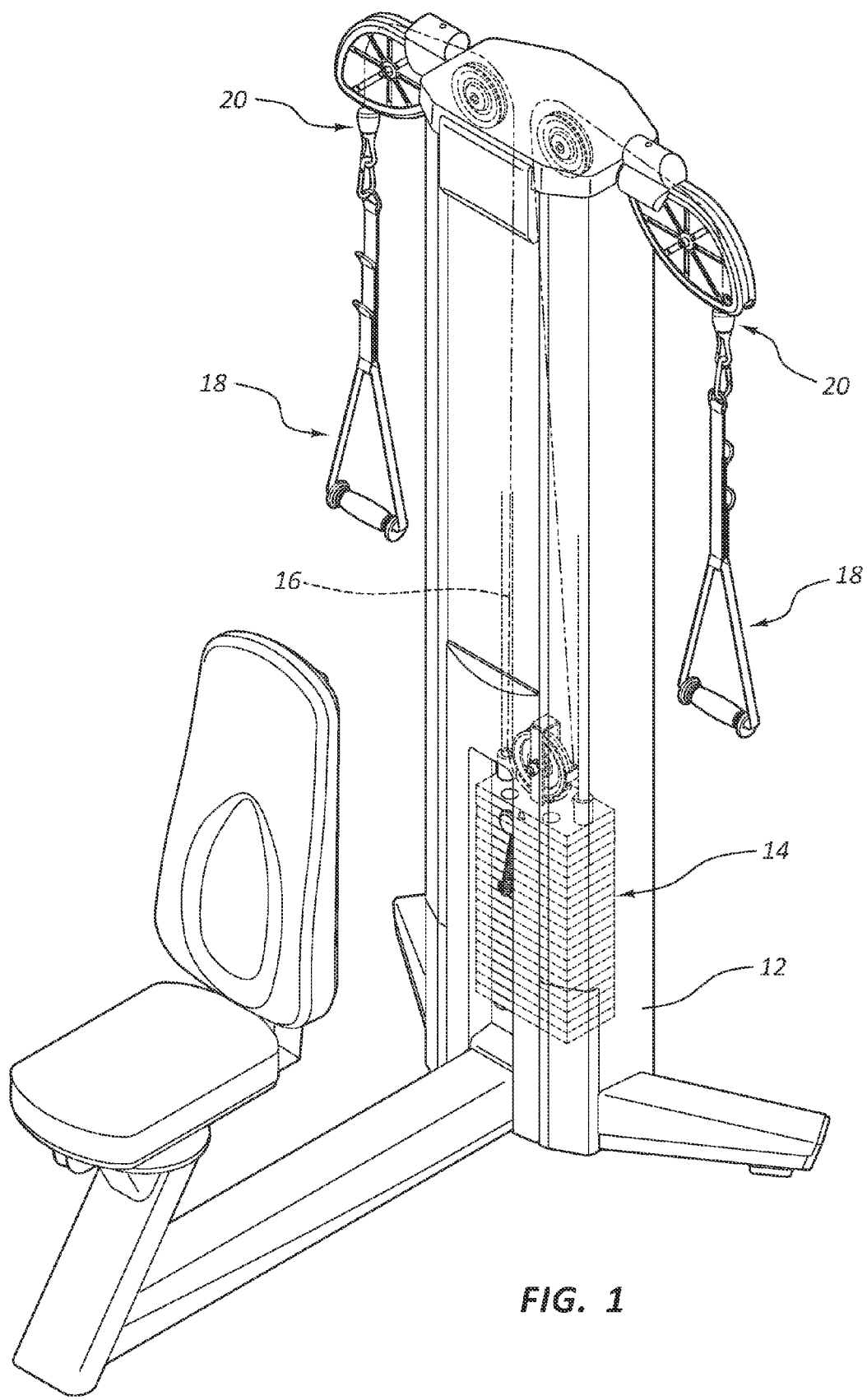
FIG. 1 is an isometric view of an exercise machine including hook assemblies, according to an embodiment of the present disclosure.

As shown in FIG. 1, an exercise machine 10 may comprise a frame 12, an adjustable weight source, such as a weight stack assembly 14, a weighted cable 16, and one or more components for engagement by a user, such as handles 18. Each end of the weighted cable 16 may be attached to a handle 18 via a hook assembly 20 and a mid portion of the weighted cable 16 may be attached to the weight stack assembly 14.

As shown in FIG. 2A, the hook assembly 20 may comprise a base portion 22 rotatably coupled to the weighted cable 16 of the exercise machine 10. A hook 24 may be coupled to the base portion 22, the hook 24 sized and configured for selective attachment to the handle 18. The base portion 22 may be sized and configured to facilitate rotation of the hook 24 relative to the frame 12 of the exercise machine 10 when the weighted cable 16 is extended and prevent rotation of the hook 24 relative to the frame 12 of the exercise machine 10 when the weighted cable 16 is fully retracted. For example, when the weighted cable 16 is fully retracted, the base portion 22 may be positioned against the frame 12 of the exercise machine 10 and friction between the frame 12 and the base portion 22 may prevent rotation of the base portion 22 and the hook 24. When a user pulls on the handle 18 and the weighted cable 16 is extended, the base portion 22 may be moved from within contact with the frame 12 and the base portion 22 and the hook 24 may be free to rotate.

In some embodiments, the base portion 22 may be comprised of a polymer, such as a rubber. The polymer may be selected to elastically deform against the frame 12 of the exercise machine 10 when the weighted cable 16 is fully retracted. Accordingly, in addition to friction forces between the frame 12 and the base portion 22, mechanical interference between the frame 12 and the base portion 22 may prevent rotation of the base portion 22 and the hook 24 relative to the frame 12 when the weighted cable 16 is retracted.

The hook assembly 20 may further comprise a retaining member 26 configured to cooperate with the hook 24 to selectively prevent removal of the handle 18 from the hook 24. The retaining member 26 may include a curved latch 28 hinged to the hook 24, as shown in FIGS. 2A and 2B. The curved latch 28 may be hinged to the hook 24 by a pin 30 and a torsion spring may be positioned on the pin 30 to bias the retaining member 26 to a locked position, shown in FIG. 2A. When the retaining member 26 is in the locked position, the retaining member 26 may prevent the removal of the handle 18 from the hook 24 by closing the opening to the hook 24.

To facilitate the insertion or removal of the handle 18, a portion of the handle 18 or a user's finger may be used to apply a force to an outer face of the curved latch 28 to overcome the biasing force of the torsion spring and position the retaining member 26 in an open position, shown in FIG. 2B. When the retaining member 26 is positioned in the open position, the opening to the hook 24 may be substantially unobstructed by the retaining member 26. Accordingly, when the retaining member 26 is positioned in the open position, the handle 18 may be freely inserted into and/or removed from the hook 24.

Since the base portion 22 of the hook assembly 20 may prevent any significant movement of the hook 24 relative to the frame 12 of the exercise machine 10 when the weighted cable 16 is fully retracted, a user may easily operate the retaining member 26 and insert or remove the handle 18 from the stationary hook 24. A user may even be able to insert and/or remove the handle 18 from the hook assembly 20 with a single hand.

In further embodiments, as shown in FIGS. 3A and 3B, a hook assembly 32 may have a retaining member 34 that includes a shaped wire 36 hinged to a hook 38. The shaped wire 36 may be formed from a metal wire, such as a stainless steel wire. The shaped wire 36 may include a portion inserted into an aperture in the hook 38 and may provide a hinge. The shaped wire 36 may additionally include an end portion 40 configured to selectively block the opening to the hook 38 and an extending portion 42 configured to facilitate movement of the shaped wire 36 by a user.

The hook 38 may include a recessed region 44 sized and configured to receive the end portion 40 of the shaped wire 36. Accordingly, when the shaped wire 36 is positioned in the locked position, as shown in FIG. 3A, the end portion 40 of the shaped wire 36 may be positioned within the recessed region 44 of the hook 38 and the opening to the hook 38 may be blocked. A user may push or pull on the extending portion 42, such as with a finger, and move the shaped wire 36 to an open position, as shown in FIG. 3B, wherein the opening to the hook 38 is substantially unobstructed.

When the weighted cable 16 is fully retracted, a base portion 46 of the hook assembly 32 may cooperate with the frame 12 to hold the hook 38 in a fixed position. When the hook 38 is in a fixed position, a user may position the shaped wire 36 in the open position, as shown in FIG. 3B, to facilitate the insertion of the handle 18 into the hook 38. The user may then position the shaped wire 36 in the locked position, as shown in FIG. 3A, and the shaped wire 36 may prevent removal of the handle 18 from the hook 38. The user may then withdraw the weighted cable 16 with the handle 18 to exercise and the hook assembly 32 may facilitate rotation of the handle 18 relative to the weighted cable 16.

When the user has completed the exercise, the weighted cable may be fully retracted again and the base portion 46 of the hook assembly 32 may cooperate with the frame 12 to hold the hook 38 in a fixed position. If the user desires to remove the handle 18 from the hook 38, such as to insert a different handle or another exercise apparatus, the shaped wire 36 may be moved to the open position. The handle 18 may then be removed from the hook 38.

Figure 4A:
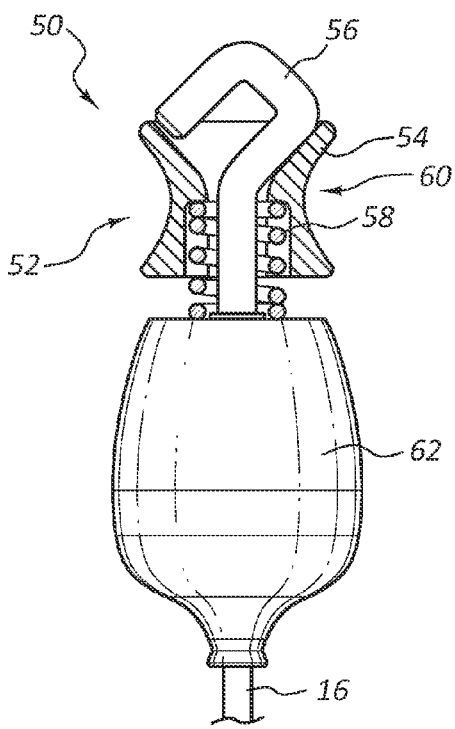
FIG. 4A is a side view of a hook assembly having a retaining member including an annular sleeve, according to an embodiment of the present disclosure, wherein the retaining member is located in a locked position.
Figure 4B:
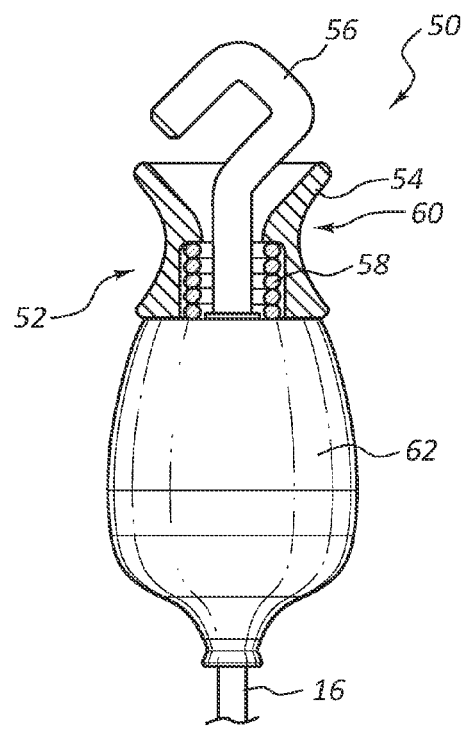
FIG. 4B is a side view of the hook assembly of FIG. 4A, wherein the retaining member is located in an open position.

In further embodiments, as shown in FIGS. 4A and 4B, a hook assembly 50 may have a retaining member 52 that includes an annular sleeve 54 positioned on a hook 56. The annular sleeve 54 may be positioned on a shaft of the hook 56 and a compression spring 58 may also be positioned on the shaft of the hook 56, the compression spring 58 biasing the annular sleeve 54 toward the opening of the hook 56. The annular sleeve 54 may be shaped and configured to selectively block the opening of the hook 56. Additionally, the annular sleeve 54 may include a recessed region 60 configured to facilitate gripping and movement of the annular sleeve 54 by a user.

The compression spring 58 will bias the annular sleeve 54 to a locked position, as shown in FIG. 4A, wherein an end of the annular sleeve 54 may be positioned adjacent an end of the hook 56 and block the opening to the hook 56. A user may grip the recessed region 60 of the annular sleeve 54 and push or pull on the annular sleeve 54 with sufficient force to overcome the biasing force of the compression spring 58 and move the annular sleeve 54 to an open position, as shown in FIG. 4B.

When the weighted cable 16 is fully retracted, a base portion 62 of the hook assembly 50 may cooperate with the frame 12 of the exercise machine 10 to hold the hook 56 in a fixed position. When the hook 56 is in a fixed position, a user may move the annular sleeve 54 to the open position, as shown in FIG. 4B, to facilitate the insertion of the handle 18 into the hook 56. The user may then release the annular sleeve 54 and the compression spring 58 may bias the annular sleeve 54 to the locked position, as shown in FIG. 4A, and the annular sleeve 54 may prevent removal of the handle 18 from the hook 56. The user may then withdraw the weighted cable 16 with the handle 18 to exercise and the hook assembly 50 may facilitate rotation of the handle 18 relative to the weighted cable 16.

When the user has completed the exercise, the weighted cable 16 may be fully retracted again and the base portion 62 of the hook assembly 50 may cooperate with the frame 10 to hold the hook 56 in a fixed position. If the user desires to remove the handle 18 from the hook 56, such as to insert a different handle or another exercise apparatus, the annular sleeve 54 may be moved to the open position. As the annular sleeve 54 is held in the open position by the user, the handle 18 may be removed from the hook 56.

Figure 5A:
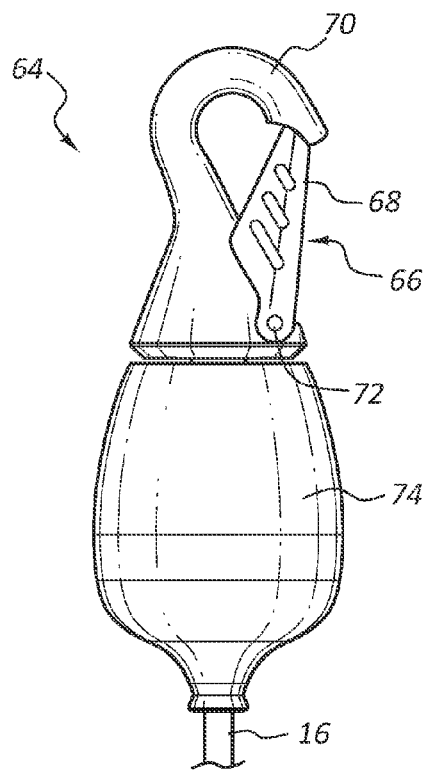
FIG. 5A is a side view of a hook assembly having a retaining member including a nesting latch, according to an embodiment of the present disclosure, wherein the retaining member is located in a locked position.
Figure 5B:
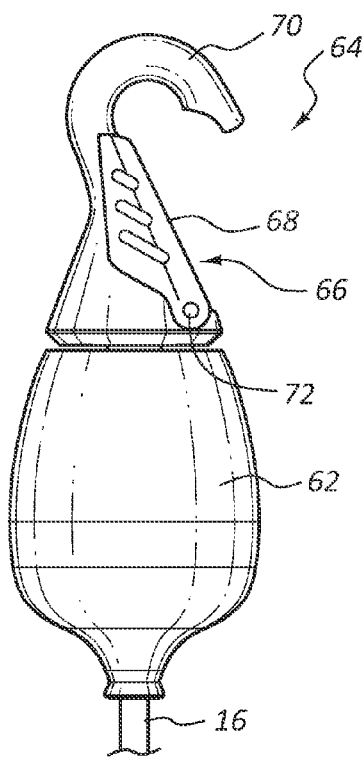
FIG. 5B is a side view of the hook assembly of FIG. 5A, wherein the retaining member is located in an open position.

In further embodiments, as shown in FIGS. 5A and 5B, a hook assembly 64 may have a retaining member 66 that includes a nesting latch 68 positioned on a hook 70. The nesting latch 68 may be hinged to the hook 70 by a pin 72 and a torsion spring may be positioned on the pin 72, the torsion spring biasing the nesting latch 68 toward the end of the hook 70. The nesting latch 68 may be shaped and configured to selectively block an opening to the hook 70.

The nesting latch 68 may be formed form a metal sheet and shaped to correspond to an underlying portion of the hook 70. Accordingly, the nesting latch 68 may be shaped and configured to nest with the underlying portion of the hook 70, as shown in FIG. 5B.

The torsion spring will bias the nesting latch 68 to a locked position, as shown in FIG. 5A, wherein an end of the nesting latch 68 may be positioned adjacent an end of the hook 70 and block the opening to the hook 70. A user may push on the nesting latch 68, such as with a portion of the handle, with sufficient force to overcome the biasing force of the torsion spring and move the nesting latch 68 to an open position, as shown in FIG. 5B.

When the weighted cable 16 is fully retracted, a base portion 74 of the hook assembly 64 may cooperate with the frame 12 to hold the hook 70 in a fixed position. When the hook 70 is in a fixed position, a user may move the nesting latch 68 to the open position, as shown in FIG. 5B, to facilitate the insertion of the handle 18 into the hook 70. The nesting latch 68 may then be released and the torsion spring may bias the nesting latch 68 to the locked position, as shown in FIG. 5A, and the nesting latch 68 may prevent removal of the handle 18 from the hook 70. The user may then withdraw the weighted cable 16 with the handle 18 to exercise and the hook assembly 64 may facilitate rotation of the handle 18 relative to the weighted cable 16.

When the user has completed the exercise, the weighted cable 16 may be fully retracted again and the base portion 74 of the hook assembly 64 may cooperate with the frame 12 of the exercise machine 10 to hold the hook 70 in a fixed position. If the user desires to remove the handle 18 from the hook 70, such as to insert a different handle or another exercise apparatus, the nesting latch 68 may be moved to the open position. As the nesting latch 68 is held in the open position by the user, the handle 18 may be removed from the hook 70.

In further embodiments, as shown in FIGS. 6A and 6B, a hook assembly 76 may have a retaining member 78 that includes interlocking hook ends 80. The hook assembly 76 may include a first hook 82 coupled to a base portion 84 via a pin 86 and a second hook 88 coupled to the base portion 84 via the pin 86. Accordingly, the first hook 82 may be rotatable relative to the second hook 88 and the base portion 84 via the pin 86. Similarly, the second hook 88 may be rotatable relative to the first hook 82 and the base portion 84 via the pin 86. A torsion spring may be positioned on the pin 86, having a first end coupled to the first hook 82 and a second end coupled to the second hook 88. The torsion spring may bias the interlocking hook ends 80 of the first hook 82 and the second hook 88 together in an interlocking configuration, as shown in FIG. 6A.

Each of the first hook 82 and the second hook 88 may include a respective extending lever arm 90, which may include a textured gripping surface 92. The extending lever arms 90 may be positioned to facilitate separating the interlocking hook ends 80 of the first and second hooks 82 and 80 from the interlocked position (see FIG. 6A) to the open position (see FIG. 6B) by pinching the extending lever arms 90 together.

When the weighted cable 16 is fully retracted, the base portion 84 of the hook assembly 76 may cooperate with the frame 12 to hold the hook assembly 76 in a fixed position. When the hook assembly 76 is in a fixed position, a user may pinch the extending lever arms 90 of the first and second hooks 82 and 86 together to position the interlocking hook ends 80 of the first and second hooks 82 and 86 in the open position, as shown in FIG. 6B, to facilitate the insertion of the handle 18 into the hook. The extending lever arms 90 may then be released and the torsion spring may bias the interlocking hook ends 80 of the first and second hooks 82 and 88 together, as shown in FIG. 6A, and the interlocking hook ends 80 of the first and second hooks 82 and 88 may prevent removal of the handle 18 from the hook assembly 76. The user may then withdraw the weighted cable 16 with the handle 18 to exercise and the hook assembly 76 may facilitate rotation of the handle 18 relative to the weighted cable 16.

When the user has completed the exercise, the weighted cable 16 may be fully retracted again and the base portion 84 of the hook assembly 76 may cooperate with the frame 12 of the exercise machine 10 to hold the hook assembly 76 in a fixed position. If the user desires to remove the handle 18 from the first and second hooks 82 and 88, such as to insert a different handle or another exercise apparatus, the first and second hooks 82 and 88 may be moved to the open position by pinching the extending lever arms 90. As the first and second hooks 82 and 88 are held in the open position by the user, the handle 18 may be removed from the hook assembly 76.

In further embodiments, as shown in FIGS. 7A and 7B, a hook assembly 94 may have a retaining member 96 that includes a latch 98 with a thumb roll 100 positioned on a hook 102. The latch 98 may be hinged to the hook with a pin 104 and a torsion spring may be positioned on the pin 104, the torsion spring biasing the latch 98 toward the end of the hook 102. The latch 98 may be shaped and configured to selectively block an opening to the hook 102.

The torsion spring will bias the latch 98 to a locked position, as shown in FIG. 7A, wherein an end of the latch 98 may be positioned adjacent an end of the hook 102 and block the opening to the hook 102. A user may push on the thumb roll 100 of the latch 98 with sufficient force to overcome the biasing force of the torsion spring and move the latch 98 to an open position, as shown in FIG. 7B.

When the weighted cable 16 is fully retracted, a base portion 106 of the hook assembly 94 may cooperate with the frame 12 of the exercise machine 10 to hold the hook 102 in a fixed position. When the hook 102 is in a fixed position, a user may push the thumb roll 100 to move the latch 98 to the open position, as shown in FIG. 7B, to facilitate the insertion of the handle 18 into the hook 102, or may utilize the handle 18 to push the latch 98 to the open position. The latch 98 may then be released and the torsion spring may bias the latch 98 to the locked position, as shown in FIG. 7A, and the latch 98 may prevent removal of the handle 18 from the hook 102. The user may then withdraw the weighted cable 16 with the handle 18 to exercise and the hook assembly 94 may facilitate rotation of the handle 18 relative to the weighted cable 16.

When the user has completed the exercise, the weighted cable 16 may be fully retracted again and the base portion 106 of the hook assembly 94 may cooperate with the frame 12 of the exercise machine 10 to hold the hook 102 in a fixed position. If the user desires to remove the handle 18 from the hook 102, such as to insert a different handle or another exercise apparatus, the latch 98 may be moved to the open position via the thumb roll 100. As the latch 98 is held in the open position by the user applying pressure to the thumb roll 100, the handle 18 may be removed from the hook 102.

In further embodiments, as shown in FIGS. 8A and 8B, a hook assembly 110 may have a retaining member 112 that includes a latch 114 with an extending lever arm 116 positioned on a hook 118. The latch 114 may be hinged to the hook 118 and a spring clip 120 may be positioned between the extending lever arm 116 and the hook 118, the spring clip 120 biasing the latch 114 toward the end of the hook 118. The latch 114 may be shaped and configured to selectively block an opening to the hook 118.

The spring clip 120 will bias the latch 114 to a locked position, as shown in FIG. 8A, wherein an end 122 of the latch 114 may be positioned within a recessed region 124 of the hook 118 and block the opening to the hook 118. A user may push on the extending lever arm 116 of the latch 114 with sufficient force to overcome the biasing force of the spring clip 120 and move the latch 114 to an open position, as shown in FIG. 8B.

When the weighted cable 16 is fully retracted, a base portion 126 of the hook assembly 110 may cooperate with the frame 12 of the exercise machine 10 to hold the hook 118 in a fixed position. When the hook 118 is in a fixed position, a user may push the extending lever arm 116 to move the latch 114 to the open position, as shown in FIG. 8B, to facilitate the insertion of the handle 18 into the hook 118, or may utilize a portion of the handle 18 to push the latch 114 to the open position. The latch 114 may then be released and the spring clip 120 may bias the latch 114 to the locked position, as shown in FIG. 8A, and the latch 114 may prevent removal of the handle 18 from the hook 118. The user may then withdraw the weighted cable 16 with the handle 18 to exercise and the hook assembly 110 may facilitate rotation of the handle 18 relative to the weighted cable 16.

When the user has completed the exercise, the weighted cable 16 may be fully retracted again and the base portion 126 of the hook assembly 110 may cooperate with the frame 12 of the exercise machine 10 to hold the hook 118 in a fixed position. If the user desires to remove the handle 18 from the hook 118, such as to insert a different handle or another exercise apparatus, the latch 114 may be moved to the open position via the extending lever arm 116. As the latch 114 is held in the open position by the user applying pressure to the extending lever arm 116, the handle 18 may be removed from the hook 118.

In further embodiments, as shown in FIGS. 9A and 9B, an end of the handle 18 may include an enlarged end portion 130 and a hook assembly 132 may include a hook 134 that includes a channel 136 shaped to slidably receive the enlarged end portion 130. The channel 136 may be shaped to prevent longitudinal movement of the enlarged end portion 130 relative to the hook 134 when the enlarged end portion 130 is positioned within the channel 136. A retaining member 138 of the hook assembly 132 may include an annular sleeve 140 positioned on the hook 134.

The annular sleeve 140 may be positioned on a shaft of the hook 134 and a compression spring 142 may also be positioned on the shaft of the hook 134, the compression spring 142 biasing the annular sleeve 140 toward the channel 136 in the hook 134. The annular sleeve 140 may be shaped and configured to selectively block each end of the channel 136. Additionally, the annular sleeve 140 may include a recessed region 144 configured to facilitate gripping and movement of the annular sleeve 140 by a user.

The compression spring 142 will bias the annular sleeve 140 to a locked position, as shown in FIG. 9A, wherein the annular sleeve 140 may be positioned adjacent an end of the hook 134 and block the ends of the channel 136. A user may grip the recessed region 144 of the annular sleeve 140 and push or pull on the annular sleeve 140 with sufficient force to overcome the biasing force of the compression spring 142 and move the annular sleeve 140 to an open position, as shown in FIG. 9B.

When the weighted cable is fully retracted 16, a base portion 146 of the hook assembly 132 may cooperate with the frame 12 or the exercise machine 10 to hold the hook 134 in a fixed position. When the hook 134 is in a fixed position, a user may move the annular sleeve 140 to the open position, as shown in FIG. 9B, to facilitate the insertion of the enlarged end portion 130 of the handle 18 into the channel 136 of the hook 134 by inserting the enlarged end portion 130 through one of the ends of the channel 136. The user may then release the annular sleeve 140 and the compression spring 142 may bias the annular sleeve 140 to the locked position, as shown in FIG. 9A, and the annular sleeve 140 may close the ends of the channel 136 and prevent removal of the enlarged end portion 130 of the handle 18 from the channel 136. The user may then withdraw the weighted cable 16 with the handle 18 to exercise and the hook assembly 132 may facilitate rotation of the handle 18 relative to the weighted cable 16.

When the user has completed the exercise, the weighted cable 16 may be fully retracted again and the base portion 146 of the hook assembly 132 may cooperate with the frame 12 of the exercise machine 10 to hold the hook 134 in a fixed position. If the user desires to remove the handle 18 from the hook 134, such as to insert a different handle or another exercise apparatus, the annular sleeve 140 may be moved to the open position. As the annular sleeve 140 is held in the open position by the user, the enlarged end portion 130 of the handle 18 may be slid out of an open end of the channel 136 and removed from the hook 134.

INDUSTRIAL APPLICABILITY

Many exercise machines include one or more weighted cables that are coupled to an adjustable weight source, such as a stack of weights. Another end of the weighted cable may be coupled to a component with which a user engages with to exercise, such as a handle. Accordingly, the weighted cable may provide resistance force to a user during exercise by transferring force from the adjustable weight source.

Some exercise machines include a hook at an end of the weighted cable that allows a user to attach the end of the weighted cable to a handle. Typically, the weighted cable includes a loop or eyelet positioned at the end with an s-hook inserted therein. The s-hook facilitates the insertion and removal of the handle, but there are several shortcomings to this arrangement. The s-hook may dangle from the eyelet free to rotate and move about as a user is attempting to insert a handle. Accordingly, a user may have to hold the eyelet steady with one hand while inserting the handle with another hand. Additionally, the handle may unexpectedly be released from the s-hook as the handle moves and swings relative to the s-hook during use.

As shown in FIG. 1, an exercise machine may comprise a frame, an adjustable weight source, such as a weight stack assembly, a weighted cable, and one or more components for engagement by a user, such as handles. Each end of the weighted cable may be attached to a handle via a hook assembly and a mid portion of the weighted cable 16 may be attached to the weight stack assembly.

These hook assemblies may overcome many shortcomings in the prior art. For example, the hook assemblies may maintain a hook in a fixed position when the weighted cable is retracted, which may make inserting or removing the handle easier. In some embodiments, a user may be able to insert and/or remove the handle from the hook assembly with a single hand. Additionally, the hook assemblies include retaining members that may prevent the handle from coming out of the hook when the exercise machine is operational, yet may facilitate easy removal of the handle by the user.

As shown in FIG. 2A, the hook assembly may comprise a base portion rotatably coupled to the weighted cable of the exercise machine. A hook may be coupled to the base portion, the hook sized and configured for selective attachment to a handle. The base portion may be sized and configured to facilitate rotation of the at least one hook relative to a frame of an exercise machine when the weighted cable is extended and prevent rotation of the at least one hook relative to the frame of the exercise machine when the weighted cable is fully retracted. For example, when the weighted cable is fuller refracted, the base portion may be positioned against the frame of the exercise machine and friction between the frame and the base portion may prevent rotation of the base portion and the hook. When a user pulls on the handle and the weighted cable is extended, the base portion may be moved from within contact with the frame and the base portion and the hook may be free to rotate.

Accordingly, the hook may be maintained in a fixed position to facilitate the insertion and/or removal of the handle, yet may facilitate rotation of the handle relative to the weighted cable during use. This may prevent an undesirable torque from being transferred from the handle to the weighted cable.

In some embodiments, the base portion may be comprised of a polymer, such as a rubber. The polymer may be selected to elastically deform against the frame of the exercise machine when the weighted cable is fully retracted. Accordingly, in addition to friction forces between the frame and the base portion, mechanical interference between the frame and the base portion may prevent rotation of the base portion and the hook relative to the frame when the weighted cable is retracted.

The hook assembly may further comprise a retaining member configured to cooperate with the at least one hook to selectively prevent removal of the handle from the at least one hook. The retaining member may include a curved latch hinged to the hook, as shown in FIGS. 2A and 2B. The curved latch may be hinged to the hook by a pin and a torsion spring may be positioned on the pin to bias the retaining member to a locked position, shown in FIG. 2A. When the retaining member is in the locked position, the retaining member may prevent the removal of the handle from the hook by closing the opening to the hook.

Accordingly, the torsion spring may automatically lock the retaining member over the hook opening after the handle is inserted into the hook. This may improve the safety of the hook assembly, as a user does not have to remember to look the retaining member after the insertion of the handle.

To allow the insertion or removal of the handle, the handle or a user's finger may be used to apply a force to the outer face of the curved latch to overcome the biasing force of the torsion spring and position the retaining member in an open position, shown in FIG. 2B. When the retaining member is positioned in the open position, the opening to the hook may be substantially unobstructed by the retaining member. Accordingly, when the retaining member is positioned in the open position, the handle may be freely inserted into and/or removed from the hook.

Since the base portion of the hook assembly may prevent any significant movement of the hook relative to the frame of the exercise machine when the weighted cable is fully refracted, a user may easily operate the retaining member and insert or remove the handle from the stationary hook. A user may even be able to insert and/or remove the handle from the hook assembly with a single hand.

Additionally, by allowing the user to utilize either their finger or a portion of the handle to open the retaining member, the hook assembly further facilitates the easy insertion of the handle into the hook.

In further embodiments, as shown in FIGS. 3A and 3B, a hook assembly may have a retaining member that includes a shaped wire hinged to the hook. The shaped wire may be formed from a metal wire, such as a stainless steel wire. The shaped wire may include a portion inserted into an aperture in the hook and may provide a hinge. The shaped wire may additionally include an end portion configured to selectively block the opening to the hook and an extending portion configured to facilitate movement of the shaped wire by a user.

A shaped wire may provide an economical and easily manufactured retaining member.

The hook may include a recessed region sized and configured to receive the end portion of the shaped wire. Accordingly, when the shaped wire is positioned in the locked position, as shown in FIG. 3A, the end portion of the shaped wire may be positioned within the recessed region of the hook and the opening. A user may push or pull on the extending portion, such as with a finger, and move the shaped wire to an open position, as shown in FIG. 3B.

When the weighted cable is fully retracted, the base portion of the hook assembly may cooperate with the frame to hold the hook in a fixed position. When the hook is in a fixed position, a user may position the shaped wire in the open position, as shown in FIG. 3B, to facilitate the insertion of the handle into the hook. The user may then position the shaped wire in the locked position, as shown in FIG. 3A, and the shaped wire may prevent removal of the handle from the hook. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the shaped wire may be moved to the open position. The handle may then be removed from the hook.

In further embodiments, as shown in FIGS. 4A and 4B, a hook assembly may have a retaining member that includes an annular sleeve positioned on the hook. The annular sleeve may be positioned on a shaft of the hook and a compression spring may also be positioned on the shaft of the hook, the compression spring biasing the annular sleeve toward the hook opening. The annular sleeve may be shaped and configured to selectively block an opening to the hook. Additionally, the annular sleeve may include a recessed region configured to facilitate gripping and movement of the annular sleeve by a user.

The spring will bias the annular sleeve to a locked position, as shown in FIG. 4A, wherein an end of the annular sleeve may be positioned adjacent an end of the hook and block the opening to the hook. A user may grip the recessed portion of the annular sleeve and push or pull on the annular sleeve with sufficient force to overcome the biasing force of the compression spring and move the annular sleeve to an open position, as shown in FIG. 4B.

Accordingly, the compression spring may automatically lock the retaining member over the hook opening after the handle is inserted into the hook. This may improve the safety of the hook assembly, as a user does not have to remember to look the retaining member after the insertion of the handle.

When the weighted cable is fully retracted, the base portion of the hook assembly may cooperate with the frame to hold the hook in a fixed position. When the hook is in a fixed position, a user may move the annular sleeve to the open position, as shown in FIG. 4B, to facilitate the insertion of the handle into the hook. The user may then release the annular sleeve and the compression spring may bias the annular sleeve to the locked position, as shown in FIG. 4A, and the annular sleeve may prevent removal of the handle from the hook. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the annular sleeve may be moved to the open position. As the annular sleeve is held in the open position by the user, the handle may be removed from the hook.

In further embodiments, as shown in FIGS. 5A and 5B, a hook assembly may have a retaining member that includes a nesting latch positioned on the hook. The nesting latch may be hinged to the hook and a torsion spring may be positioned at the hinge, the torsion spring biasing the nesting latch toward the hook end. The nesting latch may be shaped and configured to selectively block an opening to the hook.

Accordingly, the torsion spring may automatically lock the retaining member over the hook opening after the handle is inserted into the hook. This may improve the safety of the hook assembly, as a user does not have to remember to look the retaining member after the insertion of the handle.

The nesting latch may be formed form a metal sheet and shaped to correspond to an underlying portion of the hook. Accordingly, the nesting latch may be shaped and configured to nest with the underlying portion of the hook, as shown in FIG. 5B.

By manufacturing the nesting latch from a metal sheet, such as by a stamping process, the nesting latch may be manufactured relatively easily and economically.

The torsion spring will bias the nesting latch to a locked position, as shown in FIG. 5A, wherein an end of the nesting latch may be positioned adjacent an end of the hook and block the opening to the hook. A user may grip push on the nesting latch with sufficient force to overcome the biasing force of the torsion spring and move the nesting latch to an open position, as shown in FIG. 5B.

When the weighted cable is fully retracted, the base portion of the hook assembly may cooperate with the frame to hold the hook in a fixed position. When the hook is in a fixed position, a user may move the nesting latch to the open position, as shown in FIG. 5B, to facilitate the insertion of the handle into the hook, or may utilize the handle to push the nesting latch to the open position. The nesting latch may then be released and the torsion spring may bias the nesting latch to the locked position, as shown in FIG. 5A, and the nesting latch may prevent removal of the handle from the hook. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the nesting latch may be moved to the open position. As the nesting latch is held in the open position by the user, the handle may be removed from the hook.

In further embodiments, as shown in FIGS. 6A and 6B, a hook assembly may have a retaining member that includes an interlocking hook. The hook assembly may include a first hook coupled to the base portion via a hinge pin and a second hook coupled to the base portion via the hinge pin. Accordingly, the first hook may be rotatable relative to the second hook and the base portion via the hinge joint. Similarly, the second hook may be rotatable relative to the first hook and the base portion via the hinge joint. A torsion spring may be positioned on the hinge joint, having a first end coupled to the first hook and a second end coupled to the second hook. The torsion spring may bias the ends of the first hook and the second hook together in an interlocking configuration, as shown in FIG. 6A.

Each of the first hook and the second hook may include an extending lever arm, which may include a textured gripping surface. The extending lever arms may be positioned to facilitate separating the ends of the first and second hooks from the interlocked position (see FIG. 6A) to the open position (see FIG. 6B) by pinching the lever arms together.

When the weighted cable is fully retracted, the base portion of the hook assembly may cooperate with the frame to hold the hook assembly in a fixed position. When the hook assembly is in a fixed position, a user may pinch the extending levers of the first and second hooks together to position the ends of the first and second hooks in the open position, as shown in FIG. 6B, to facilitate the insertion of the handle into the hook. The extending levers may then be released and the torsion spring may bias the first and second hooks together, interlocking the first and second hooks, as shown in FIG. 6A, and the interlocking first and second hooks may prevent removal of the handle from the hook assembly. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook assembly in a fixed position. If the user desires to remove the handle from the hook, such as to insert a different handle or another exercise apparatus, the first and second hooks may be moved to the open position by pinching the extending levers. As the first and second hooks are held in the open position by the user, the handle may be removed from the hook assembly.

In further embodiments, as shown in FIGS. 7A and 7B, a hook assembly may have a retaining member that includes a latch with a thumb roll positioned on the hook. The latch may be hinged to the hook and a torsion spring may be positioned at the hinge, the torsion spring biasing the latch toward the hook end. The latch may be shaped and configured to selectively block an opening to the hook.

The torsion spring will bias the latch to a locked position, as shown in FIG. 7A, wherein an end of the latch may be positioned adjacent an end of the hook and block the opening to the hook. A user may push on the thumb roll of the latch with sufficient force to overcome the biasing force of the torsion spring and move the latch to an open position, as shown in FIG. 7B.

When the weighted cable is fully retracted, the base portion of the hook assembly may cooperate with the frame to hold the hook in a fixed position. When the hook is in a fixed position, a user may push the thumb roll to move the latch to the open position, as shown in FIG. 7B, to facilitate the insertion of the handle into the hook, or may utilize the handle to push the latch to the open position. The latch may then be released and the torsion spring may bias the latch to the locked position, as shown in FIG. 7A, and the latch may prevent removal of the handle from the hook. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the latch may be moved to the open position via the thumb roll. As the latch is held in the open position by the user applying pressure to the thumb roll, the handle may be removed from the hook.

In further embodiments, as shown in FIGS. 8A and 8B, a hook assembly may have a retaining member that includes a latch with an extending lever positioned on the hook. The latch may be hinged to the hook and a spring clip may be positioned between the extending lever arm and the hook, the spring clip biasing the latch toward the hook end. The latch may be shaped and configured to selectively block an opening to the hook.

The spring clip will bias the latch to a locked position, as shown in FIG. 8A, wherein an end of the latch may be positioned adjacent an end of the hook and block the opening to the hook. A user may push on the extending lever of the latch with sufficient force to overcome the biasing force of the spring clip and move the latch to an open position, as shown in FIG. 8B.

Utilizing a spring clip that may be attached to either the hook or the latch, a retaining member may be provided that is relatively easy to assemble.

When the weighted cable is fully retracted, the base portion of the hook assembly may cooperate with the frame to hold the hook in a fixed position. When the hook is in a fixed position, a user may push the extending lever to move the latch to the open position, as shown in FIG. 8B, to facilitate the insertion of the handle into the hook, or may utilize the handle to push the latch to the open position. The latch may then be released and the spring clip may bias the latch to the locked position, as shown in FIG. 8A, and the latch may prevent removal of the handle from the hook. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the latch may be moved to the open position via the extending lever. As the latch is held in the open position by the user applying pressure to the extending lever, the handle may be removed from the hook.

In further embodiments, as shown in FIGS. 9A and 9B, an end of the handle may include an enlarged end portion and the hook may include a channel shaped to slidably receive the enlarged end portion and prevent longitudinal movement of the enlarged end portion relative to the hook when the enlarged end portion is positioned within the channel. The retaining member may include an annular sleeve positioned on the hook.

The annular sleeve may be positioned on a shaft of the hook and a compression spring may also be positioned on the shaft of the hook, the compression spring biasing the annular sleeve toward the channel in the hook. The annular sleeve may be shaped and configured to selectively block each end of the channel. Additionally, the annular sleeve may include a recessed region configured to facilitate gripping and movement of the annular sleeve by a user.

The spring will bias the annular sleeve to a locked position, as shown in FIG. 9A, wherein the annular sleeve may be positioned adjacent an end of the hook and block the ends of the channel. A user may grip the recessed portion of the annular sleeve and push or pull on the annular sleeve with sufficient force to overcome the biasing force of the compression spring and move the annular sleeve to an open position, as shown in FIG. 9B.

When the weighted cable is fully retracted, the base portion of the hook assembly may cooperate with the frame to hold the hook in a fixed position. When the hook is in a fixed position, a user may move the annular sleeve to the open position, as shown in FIG. 9B, to facilitate the insertion of the enlarged end of the handle into the channel of the hook by inserting the enlarged end through one of the ends of the channel. The user may then release the annular sleeve and the compression spring may bias the annular sleeve to the locked position, as shown in FIG. 9A, and the annular sleeve may close the ends of the channel and prevent removal of the enlarged end of the handle from the channel. The user may then withdraw the weighted cable with the handle to exercise and the hook assembly may facilitate rotation of the handle relative to the weighted cable.

When the user has completed the exercise, the weighted cable may be fully retracted again and the base portion of the hook assembly may cooperate with the frame to hold the hook in a fixed position. If the user desires to remove the handle from the hook, such as to insert a different handle or another exercise apparatus, the annular sleeve may be moved to the open position. As the annular sleeve is held in the open position by the user, the enlarged end of the handle may be slid out of an open end of the channel and removed from the hook.

What is claimed is:

1. An exercise machine, comprising:
   a frame;
   a weighted cable routed through the frame;
   an adjustable weight source connected to the weighted cable configured to provide a resistance force on the weighted cable; and
   at least one hook assembly located on the weighted cable, the at least one hook assembly comprising:
      a base portion rotatably coupled to the weighted cable; and
      at least one hook coupled to the base portion, the at least one hook sized and configured for selective attachment to a handle; and
      wherein the base portion is sized and configured to facilitate rotation of the at least one hook relative to the frame when the weighted cable is extended by a pull force that overcomes the resistance force; and
      wherein the base portion comprises a tapered shoulder configured to insert into a cable routing structure attached to the machine such that the resistance force imposed on the weighted cable by the adjustable weight source provides a mechanical interference between the base portion and the frame that prevents rotation of the at least one hook relative to the frame when the weighted cable is fully retracted to maintain the handle in a fixed position with respect to the frame to facilitate removal of the handle from the hook portion.

2. The exercise machine of claim 1, wherein the at least one hook assembly further comprises a retaining member configured to cooperate with the at least one hook to selectively prevent removal of the handle from the at least one hook.

3. The exercise machine of claim 2, wherein the retaining member is biased to a locked position.

4. The exercise machine of claim 2, wherein the retaining member comprises a shaped wire.

5. The exercise machine of claim 2, wherein the retaining member comprises an annular sleeve.

6. The exercise machine of claim 2, wherein the retaining member comprises an extending lever configured to facilitate rotation of the retaining member relative to the at least one hook.

7. The exercise machine of claim 1, wherein the at least one hook comprises a first hook hingably coupled to the base and a second hook hingably coupled to the base, the first hook and the second hook configured to interlock.

8. The exercise machine of claim 1, wherein the handle comprises an enlarged end portion and wherein the at least one hook comprises a channel shaped to slidably receive the enlarged end portion and prevent longitudinal movement of the enlarged end portion relative to the hook when the enlarged end portion is positioned within the channel.

9. The exercise machine of claim 8, wherein the at least one hook assembly further comprises a spring biased sleeve sized and configured to selectively lock the enlarged end within the channel of the hook.

* * * * *